Jan. 28, 1964
J L H. ROUNTREE
3,119,464
SPEED CONTROLLED CABLE ENGAGING SAFETY
MECHANISM FOR ELEVATORS
Filed Feb. 26, 1962
3 Sheets-Sheet 1
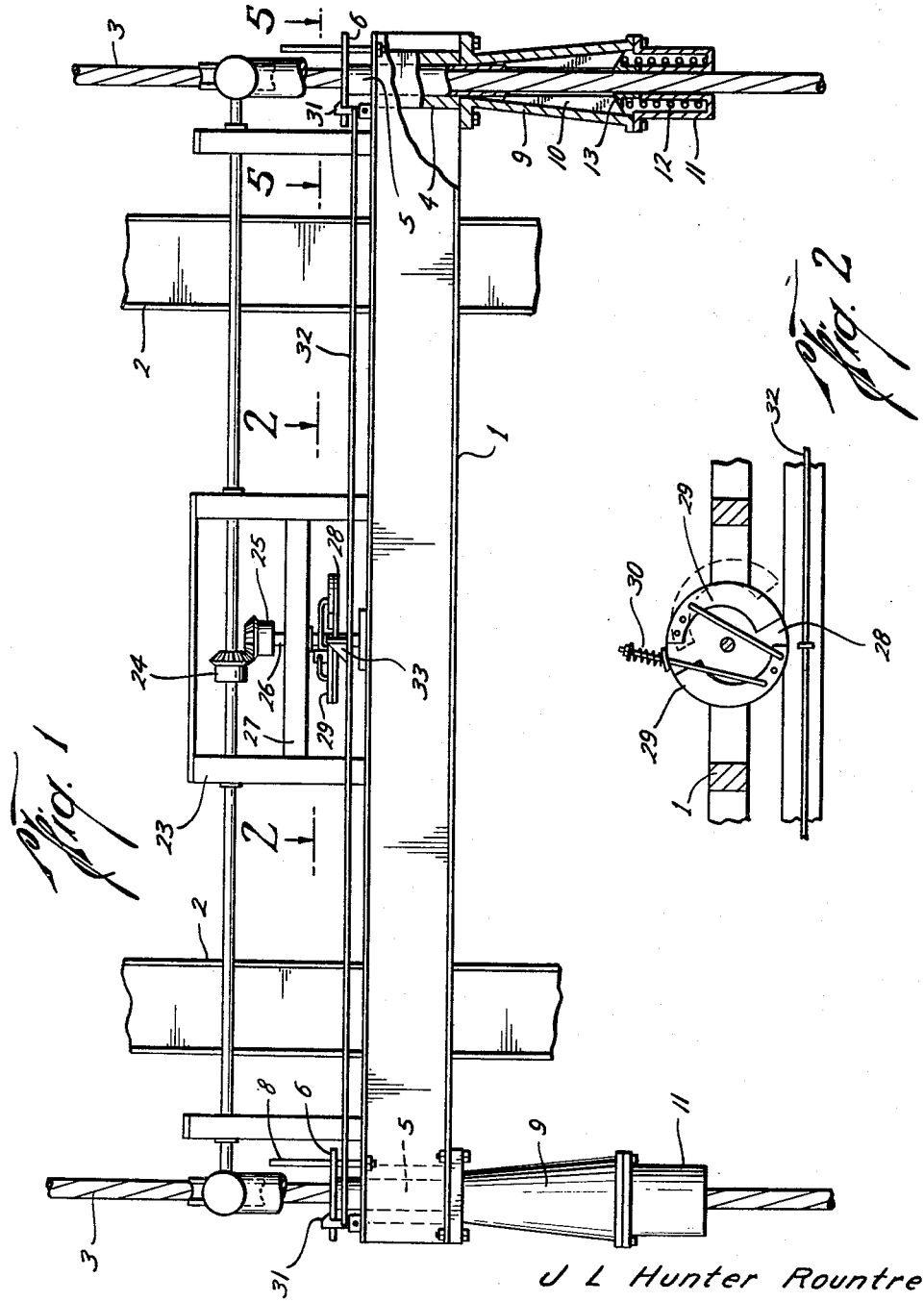
J L Hunter Rountree
INVENTOR.
BY Ramseles O. Wyatt
ATTORNEY

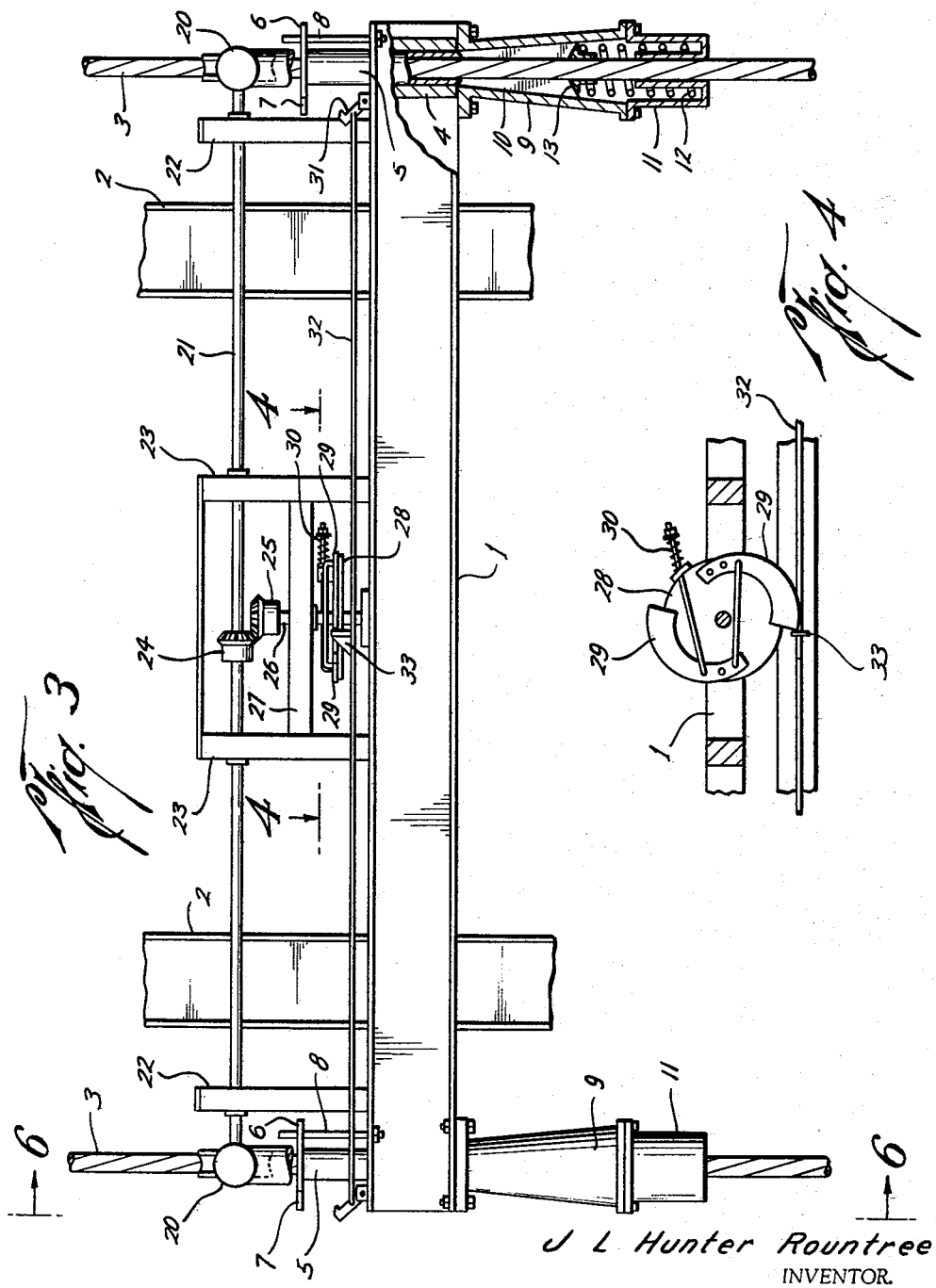

Jan. 28, 1964     J L H. ROUNTREE     3,119,464
SPEED CONTROLLED CABLE ENGAGING SAFETY
MECHANISM FOR ELEVATORS
Filed Feb. 26, 1962     3 Sheets-Sheet 3
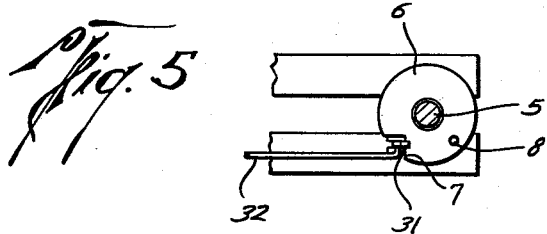
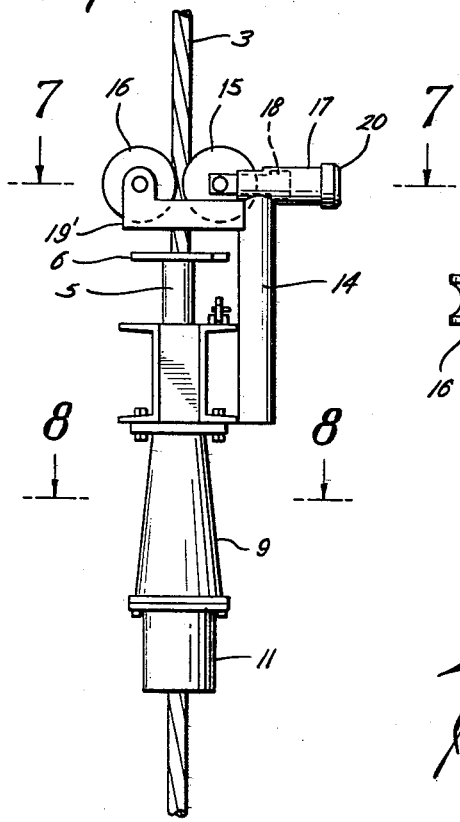
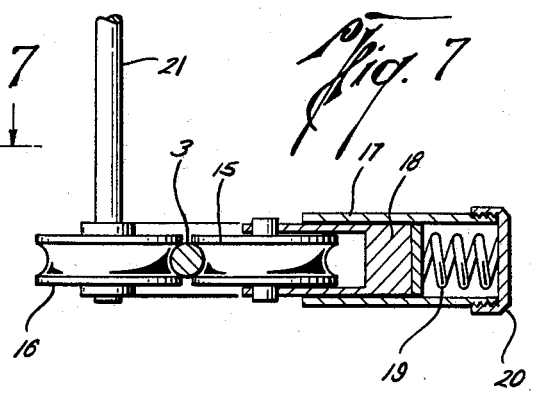
J L Hunter Rountree
INVENTOR.
BY Pamela O. Wyatt
ATTORNEY

United States Patent Office 3,119,464
Patented Jan. 28, 1964

3,119,464
SPEED CONTROLLED CABLE ENGAGING
SAFETY MECHANISM FOR ELEVATORS
J L Hunter Rountree, 6620 Long Drive, Houston, Tex.
Filed Feb. 26, 1962, Ser. No. 175,691
4 Claims. (Cl. 187—89)

This invention relates to new and useful improvements in a speed controlled cable engaging safety mechanism for elevators.

It is an object of this invention to provide a safety mechanism for workmen's elevators such as are used in open scaffolding during building construction.

It is another object of the invention to provide a safety mechanism for elevators having a novel cable engaging means movable into cable engaging position upon a predetermined speed of movement of the elevator.

A further object of the invention is to provide a safety mechanism for elevators having novel actuating means for releasing the locking mechanism from inactive position.

With the above and other objects in view, the invention has relation to certain novel features of construction, operation and arrangement of parts more particularly defined in the following specifications and illustrated in the accompanying drawings, wherein:

FIGURE 1 is a front elevational view of the safety device in inactive position and partially in cross section.

FIGURE 2 is a top view, in cross section, taken on the line 2—2 of FIGURE 1.

FIGURE 3 is a front elevational view of the safety device in locking position and partially in cross section.

FIGURE 4 is a top view, in cross section, taken on the line 4—4 of FIGURE 3.

FIGURE 5 is a cross sectional end view of the release mechanism taken on the line 5—5 of FIGURE 1.

FIGURE 6 is an end elevational view of the device taken on the line 6—6 of FIGURE 3.

FIGURE 7 is a cross sectional end view taken on the line 7—7 of FIGURE 6, and

FIGURE 8 is a cross sectional end view taken on the lnie 8—8 of FIGURE 6.

Referring now more particularly to the drawings, the numeral 1 designates a rigid support, such as structural steel, to be mounted on the top or on the bottom of an elevator car or cage (not shown) by means of the vertical supporting members 2, 2. A pair of suspension cables 3, 3 are mounted in the elevator scaffold (not shown) supporting the elevator and are preferably positioned on each side of the cage parallel to a line bisecting the cage, and vertical ports 4, 4 are formed through the structural member 1 adjacent each end thereof through which the tubular member 5 is mounted. The member 5 has an external flange 6 at its upper end and a latch receiving notch 7 is formed therein. A rigid guide 8 mounted on the member 1 and extending through the flange 6 maintains the member 5 against rotation.

Mounted on the member 1 in axial alignment with the tubular member 5 is a slip housing 9, which tapers inwardly and upwardly and in which the slip segments 10, 10 are mounted. The lower end of the tubular member 5 is tapered downwardly and inwardly and the upper ends of the slip segments 10, 10 are tapered downwardly and inwardly and abut against the lower end of the member 5. A spring housing 11 is mounted on the lower end of the housing 9 and a suitable coil spring as 12 is mounted therein and bears against the slip spear 13 constantly urging the spear 13 against the slip segments 10, 10. The upper end of the spear 13 tapers outwardly and downwardly as do the lower ends of the slip segments 10, 10. The cables 3, 3 pass through each of the tubular members 5 and the housing 9 and the faces of the slip segments 10, 10 are concave and are movable into contact with the cable 3.

Supporting members 14, 14 mounted on the structural member 1 adjacent the cable ports 4, 4 support the pulleys 15, 16, the pulley 15 being maintained in yieldable contact with the cable 3 by means of the housing 17 which is mounted on the supports 14 in which the pulley fork 18 is loosely mounted and the spring 19 bears against the fork 18 constantly urging the pulley 15 outwardly into contact with the cable 3 and the pulley 16 is maintained in fixed relation against the cable 3 by means of the supporting arms 19', 19' which are integral with and extend laterally from the supports 14. A cap 20 having internal threads is mounted on the extended end of the housing 17 and the housing 17 has external threads to receive the cap so that the tension on the spring 19 may be adjusted.

A shaft 21 joins the pulleys 16, 16 and is supported by suitable bearings in the bearing supports 22, 22, 23, 23. A gear 24 mounted on the shaft 21 is in mesh with a gear 25 which rotates the shaft 26, the shaft 26 extending vertically through the support 27 to the support 1 and rotates the governor 28. A pair of pivotal arms 29, 29 are mounted on the governor 28 and are spring loaded by means of the adjustable tension device 30.

A pair of latch members 31, 31 are pivotally mounted on the support member 1 adjacent the tubular members 5, 5 and engage the flange 6 in the latch member notches 7, 7 to hold the member 5 in released position, the tubular member 5 bearing against the slip segments 10, 10 and compressing the spring 12, the tapered ends of the tubular members 5, 5 bearing against the tapered ends of the slip segments 10, 10 and the tapered ends of the slip segments 10, 10 bearing against the tapered ends of the spears 13, 13, move the slip segments outwardly in the housing 9 maintaining them away from contact with the cables 3, 3. A rod 32 connects the latch members and a projection 33 on the rod 32 is positioned adjacent the governor 28 so that as the governor gains speed as may be determined by setting the tension means 30, the arms 29 will swing outwardly until in contact with the projection 33.

In use the tubular members 5, 5 will be locked in released position, by the latch members 31, 31, with the spring 12 compressed and the slips 10, 10 out of engagement with the cables 3, 3. As the car travels up and down, the pulleys 15, 16 will rotate and the gears 24, 25 will be rotated by the shaft 21, and will rotate the governor 28, and when a predetermined downward speed is exceeded, the arms 29, 29 will swing outwardly and contact the projection 33, knocking the latch members 31, 31 out of latched position, permitting the springs 12, 12 to move the slips 10, 10 upwardly and the tapered walls of the housing will cause the slips 10, 10 to move inwardly against the cables 3, 3 and prevent further downward movement of the car.

While the foregoing is considered a preferred form of the invention, it is by way of illustration only, the broad principle of the invention being defined by the appended claims.

What I claim is:

1. In a safety mechanism for elevator cars, a supporting member mountable transversely on an elevator car having vertical ports adjacent each end thereof, suspended cables extending through said ports, slip housings on said support in axial alignment with said ports, slips in said housings, means urging said slips into contact with said cables, release means maintaining said slips out of contact with said cables, latching means maintaining said release means in releasing position, a governor on said supporting member, means in contact with said cables to transmit the speed of travel of the car to said governor and means on said governor movable into active relation with said latch means to release said release means when a predetermined speed of rotation of said governor is acquired.

2. In a safety device for elevator cars, a rigid bisecting supporting member mountable on an elevator car, cable receiving means on said supporting member through which suspended cables are passed, slip housings mounted on said supporting member in axial alignment with said cable receiving means, said housings tapering downwardly and outwardly, a spring housing mounted on the lower end of each of said slip housings, a spring in each of said spring housings, slip segments in said slip housings having concave faces adjacent said cable, means urged by said springs in said housings against the lower ends of said slip segments, release means extending through said cable receiving means, the lower end of said release means being in contact with the upper end of said slip segments, latch means maintaining said release means in release position, means mounted on said supporting member and in contact with said cables for releasing said latch means when a predetermined speed of descent of said car is acquired.

3. In a safety mechanism for elevator cars, a pair of suspended cables, a supporting member to be mounted on an elevator car having cable ports through which said cables are extended, means mounted on said supporting member for engaging said cables and locking said supporting member against further movement, means for releasably maintaining said cable engaging means in inactive position, a pair of pulleys mounted on said supporting means adjacent each cable, means for maintaining said pulleys yieldably in contact with said cables, a shaft extending longitudinally of said supporting member and rotated by said pulleys, means rotated by said shaft for releasing said means for maintaining said cable engaging means in inactive position upon reaching a predetermined speed of rotation.

4. In a safety mechanism for elevator cars, a rigid supporting member mountable on an elevator car, a pair of suspending cables, means on said supporting member for receiving said cables, releasable locking means on said supporting member movable into contact with said cables, latch means maintaining said locking means in inactive position, means maintained in contact with said cable and movable into contact with and to move said latch means out of latching position and releasing said locking means upon a predetermined speed of descent of said car.

References Cited in the file of this patent

UNITED STATES PATENTS

| | | |
|---|---|---|
| 388,297 | Moore | Aug. 21, 1888 |
| 480,848 | Herdman | Aug. 16, 1892 |
| 645,951 | Griffen | Mar. 27, 1900 |
| 699,035 | Suman | Apr. 29, 1902 |
| 826,586 | Lepley | July 24, 1906 |
| 943,523 | Cunningham | Dec. 14, 1909 |
| 1,959,528 | Federici | May 22, 1934 |
| 2,550,839 | Martin | May 1, 1951 |